United States Patent
Cho et al.

(10) Patent No.: US 7,831,360 B2
(45) Date of Patent: Nov. 9, 2010

(54) SYSTEM FOR CLASSIFYING VEHICLE OCCUPANTS

(75) Inventors: Young Nam Cho, Suwon-si (KR); Yong-Sun Kim, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 11/966,643

(22) Filed: Dec. 28, 2007

(65) Prior Publication Data
US 2009/0012678 A1    Jan. 8, 2009

(30) Foreign Application Priority Data
Jul. 4, 2007    (KR) .................... 10-2007-0067276

(51) Int. Cl.
*G06F 7/00*    (2006.01)
(52) U.S. Cl. ........................................ 701/45
(58) Field of Classification Search ............... 701/45, 701/36; 180/271, 273; 280/735, 802, 801.1
See application file for complete search history.

(56) References Cited

U.S. PATENT DOCUMENTS 7,469,594 B2 * 12/2008 Jitsui et al. .................... 73/779

* cited by examiner

*Primary Examiner*—Kim T Nguyen
(74) *Attorney, Agent, or Firm*—Morgan, Lewis & Bockius LLP

(57) ABSTRACT

The present invention relates to a system for classifying vehicle occupants, which enables an airbag to be deployed only for an occupant corresponding to a specific type or a specific condition. The system includes a detector installed in a vehicle seat and adapted to sense variation in current occurring when an occupant is seated in the seat and a controller for determining whether the occupant is seated and which type of occupant is sitting, using a current value measured by the detector, and transmitting a result of determination to an airbag control unit. The system reduces the likelihood of erroneous occupant classifications.

8 Claims, 8 Drawing Sheets

Drawings

Prior art ht# SYSTEM FOR CLASSIFYING VEHICLE OCCUPANTS

CROSS-REFERENCE TO RELATED APPLICATIONS

This application claims priority to Korean Application No. 10-2007-0067276, filed on Jul. 4, 2007, the disclosure of which is incorporated herein by reference.

BACKGROUND OF THE INVENTION (1) Field of the Invention

The present invention relates to a system for classifying vehicle occupants, which classifies vehicle occupants seated in a seat of a vehicle in order to deploy an airbag only for an occupant of a certain age or older or having a certain physical condition.

(2) Description of the Related Art

Recently, in many cases, an airbag has been installed in a passenger seat, as well as a driver seat, for the safety of vehicle occupants. Such an airbag is deployed when a collision between vehicles occurs, thus protecting vehicle occupants. In the case of an adult, there is no problem in using an airbag, but in the case of a small child, a deployed airbag may act as a dangerous factor that threatens his life thereof.

Therefore, in some foreign countries, the standards of safety evaluation of an actual vehicle occupant seated in a passenger seat for the deployment of an airbag are established, for example, FMVSS 208, CMVSS 208, etc. FIG. 1 illustrates criteria for airbag deployment adopted by most vehicle manufacturing companies to satisfy an FMVSS 208 standard. Referring to FIG. 1, in the case of adults, an airbag is caused to be deployed, but, in the ease of small children 6 years old or younger, an airbag is prevented from being deployed. This is intended to protect small children 6 years old or younger from accidents, using a separate Child Restraint System (CRS), rather than an airbag.

As described above, in order to separately control the deployment of airbags between adults and small children, a vehicle occupant classification system capable of identifying an occupant seated in the seat of a vehicle must be installed in the seat. Some currently-used vehicle occupant classification systems additionally employ the differences between the shapes of the hips of adults and small children, but all fundamentally use the weight difference between adults and small children.

However, the conventional vehicle occupant classification system, which uses the above-commented weight differences between adults and small children as criteria for classification, is problematic in that adaptability to various situations and conditions is poor. An example of this is shown in FIG. 2. That is, typically, the gap between weights required to discriminate between adults and small children 6 years old or younger is set. However, when an adult is not seated with good posture and/or position, there is a risk of the conventional vehicle occupant classification system to erroneously determine such an adult to be a small child of about 6 years old. In this case, the adult will not be protected by an airbag if a car accident occurs. In contrast, there is also a risk of a small child of about 6 years old erroneously being determined to be an adult and thus deploy the airbag.

Further, the conventional vehicle occupant classification system is problematic in that no means for diagnosing internal errors is provided. Since whether an airbag is to be deployed when an accident occurs can be a factor for the occupant's in the car accident, such risk of error must be removed.

Moreover, the conventional vehicle occupant classification system has some drawbacks in that it restricts the design of seats because a plastic mat having a sensor therein must be installed under the cover of a seat, or a separate structure must be installed in the seat.

SUMMARY OF THE INVENTION

Accordingly, the present invention has been made keeping in mind the above problems occurring in the prior art, and is directed to provide a system for classifying vehicle occupants, which reduces the likelihood of erroneous occupant classification so that an airbag can be accurately deployed when needed.

The present invention is further directed to provide a system for classifying vehicle occupants, which has self-diagnostic ability so as to prevent erroneous occupant classification, which may occur in various situations.

The present invention is further more directed to provide a system for classifying vehicle occupants, which has a new structure that does not restrict the design of the seat of a vehicle.

In order to accomplish the above improvement, the present invention provides a system for classifying vehicle occupants, which measures variation in current occurring when a vehicle occupant is seated in a seat, and determines whether the occupant is seated and which type of occupant is sitting, using the measured current variation. The measurement of current variation may be performed in such a way that the capacitance, formed between a vehicle body and a conductor installed under the cover of a seat varies according to tire permittivity of the occupant, and the amount of charge varying with the capacitance is measured.

Since the vehicle occupant classification system of the present invention classifies occupants by measuring current instead of the weights of the occupants, a thin conductive foil or a patch covered with material having excellent conductivity can be used as the material of the system, and thus the degree of freedom in design of the seat is improved. Further, the system enables self-diagnosis through the measurement of current variation. The self-diagnosis of the system needs to be periodically performed.

The determination of an occupant type or the self-diagnosis of the system is preferably performed by comparing current values, successively measured several times, with preset comparison values. This is performed to minimize the erroneous determination of the system, which may occur by accident when conditions vary.

Meanwhile, in the present invention, a target for which an airbag is not to be deployed is changed from a small child 6 years old or younger to an infant 1 year old or younger. In this ease, since an airbag must be deployed even for small children 3 or 6 years old, there is a burden in that the injury levels of children caused by the deployment of an airbag is required to be decreased. However, recently, an airbag softer than a conventional airbag has been developed, so that the criteria, for selecting a target for which an airbag is not to be deployed have changed for the better. Further, since the target for which an airbag is not to be deployed is set to an infant 1 year old or younger, the system can more reliably prevent the problem of erroneously determining an adult to be a small child due to the change in the posture and/or position of an occupant. The usefulness of this criteria change is easily understood by referring to FIG. 3. That is, since the gap between small children and adults is much greater than that of the prior art, the likelihood of erroneous occupant classification of the system can be decreased. The method of identifying an occupant falling within the gap, that is, the gray zone, will be described in detail later.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
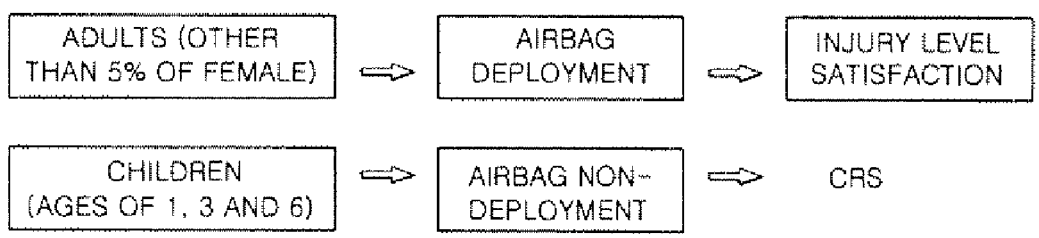
FIG. 1 is a diagram showing conventional criteria for airbag deployment.
Figure 2:
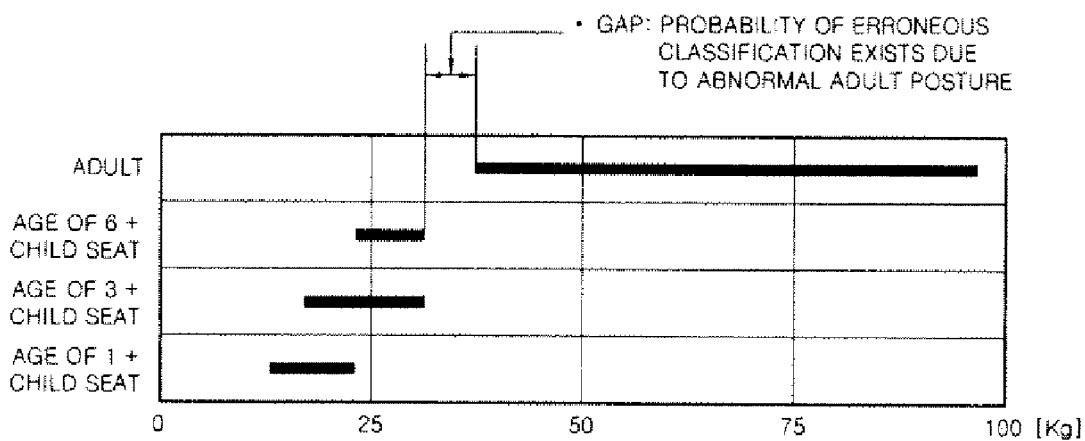
FIG. 2 is a diagram showing the problem of the airbag deployment criteria of FIG. 1.
Figure 3:
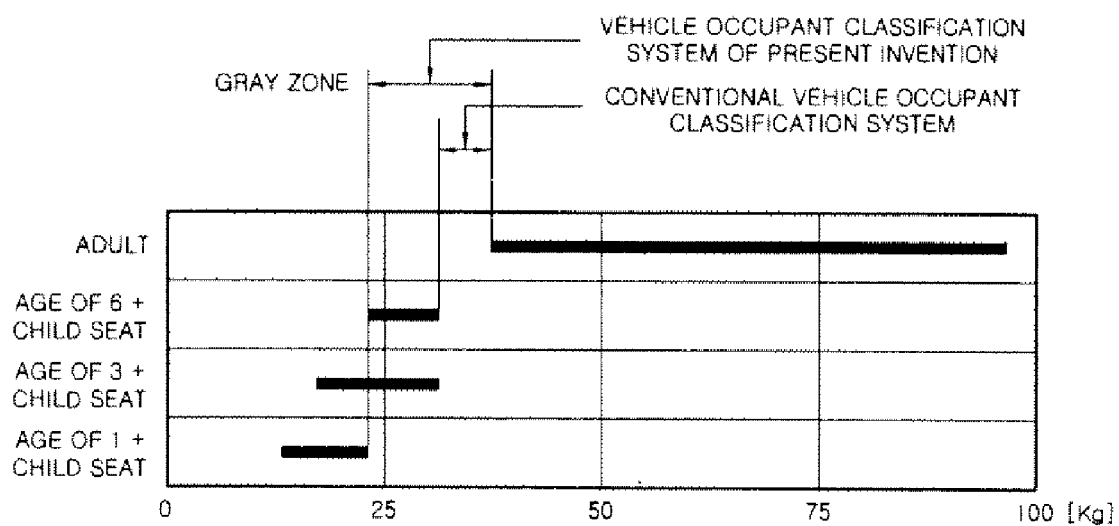
FIG. 3 is a diagram showing criteria for airbag deployment in a system for classifying vehicle occupants according to the present invention.

However, it should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 4:
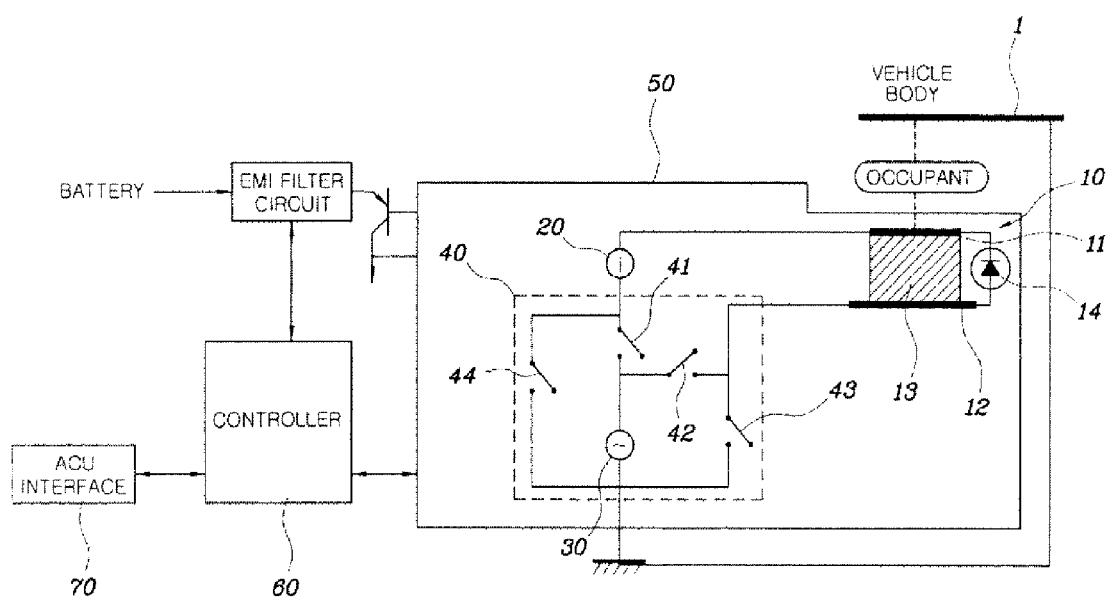
FIG. 4 is a schematic diagram showing the construction of the vehicle occupant classification system according to the present invention.
Figure 5:
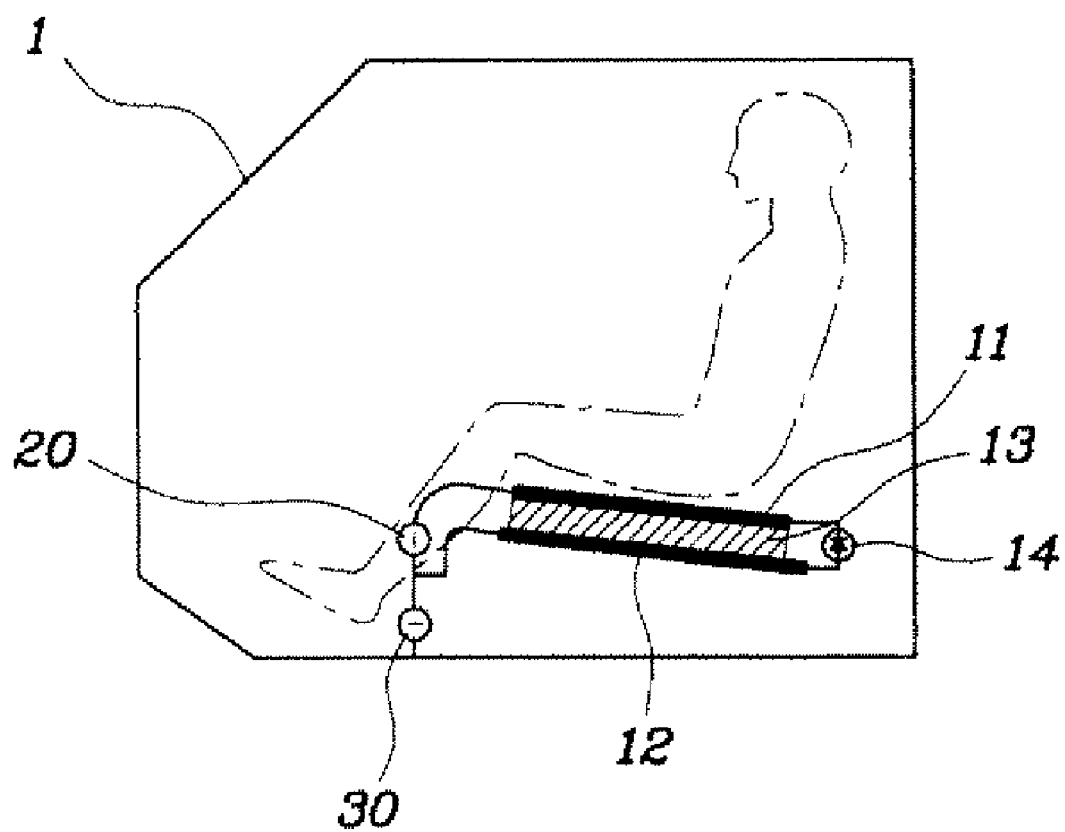
FIG. 5 is a schematic diagram showing the use of the vehicle occupant classification system of FIG. 4 according to the present invention.

With reference to FIGS. 4 and 5, embodiments for construction of a system for classifying vehicle occupants are described in accordance with the present invention.

The system includes a detector 50 for measuring variation in current occurring when an occupant is seated in a vehicle seat, and a controller 60 for identifying the occupant according to the amount of current measured by the detector 50.

The detector 50 includes a sensing unit 10 for measuring variation in current, an ammeter 20, an AC power source 30, mid a switching circuit 40.

The sensing unit 10 is installed under the cover of the seat, and is adapted to transmit variation in the amount of charge, generated in the upper portion of the sensing unit 10 when an occupant is seated in the seat, to the ammeter 20. The sensing unit 10 is implemented using a structure in which an insulator 13 is interposed between an upper sensing conductor 11 and a lower guard conductor 12, which are electrically connected to each other. The upper sensing conductor 11 may be formed of gold foil or silver foil having excellent conductivity, or of a patch covered with such a conductive material. The lower guard conductor 12 is an element that allows the upper sensing conductor 11 to transmit only variation in current, caused by an occupant seated over the upper sensing conductor 11, to the ammeter 20. Such a lower guard conductor 12 can be made of material identical or similar to that of the upper sensing conductor 11. However, the tower guard conductor 12 must be larger than the upper sensing conductor 11 so that the upper sensing conductor 11 can be isolated from a vehicle body 1 or the like under the upper sensing conductor 11.

Meanwhile, a diode 14 is arranged between the upper sensing conductor 11 and the lower guard conductor 12. The diode 14 is installed so as to keep the forward direction of current flowing from the lower guard conductor 12 to the upper sensing conductor 11. That is to say, the diode 14 allows current to flow therethrough only in a forward direction, and prevents current from flowing in a reverse direction in a normal state. It is useful for the self-diagnosis of the vehicle occupant classification system.

In an exemplary embodiment of the present invention, the ammeter 20 may be installed in order subsequent to the upper sensing conductor 11 to measure the amount of current transmitted from the upper sensing conductor 11.

The switching circuit 40, which is implemented using a circuit having four switches 41 to 44, may connect the sensing unit 10 and the ammeter 20 to each other, thus constituting one or more closed circuits therewith. The one or more closed circuits can be constituted by selectively turning on or off the four switches 41 to 44. According to an example of the use of the system, which will be described in detail later, the switching circuit 40 can constitute three different closed circuits.

AC power is supplied from the AC power source 30 to the switching circuit 40. The AC power source 30 may be an AC converter for converting DC power of a battery into AC power.

The controller 60 determines whether an occupant is seated and which type of occupant is sitting by comparing the amount of current measured by the detector 50 with a comparison value, and transmits the result of determination to an Airbag Control Unit (ACU) through an ACU interface 70. The controller 60 may include a transceiver circuit as a component for communicating with the ACU interface 70.

Meanwhile, the system may further include an Electromagnetic Interference (EMI) filter circuit for reducing electromagnetic noise.

Figure 6:
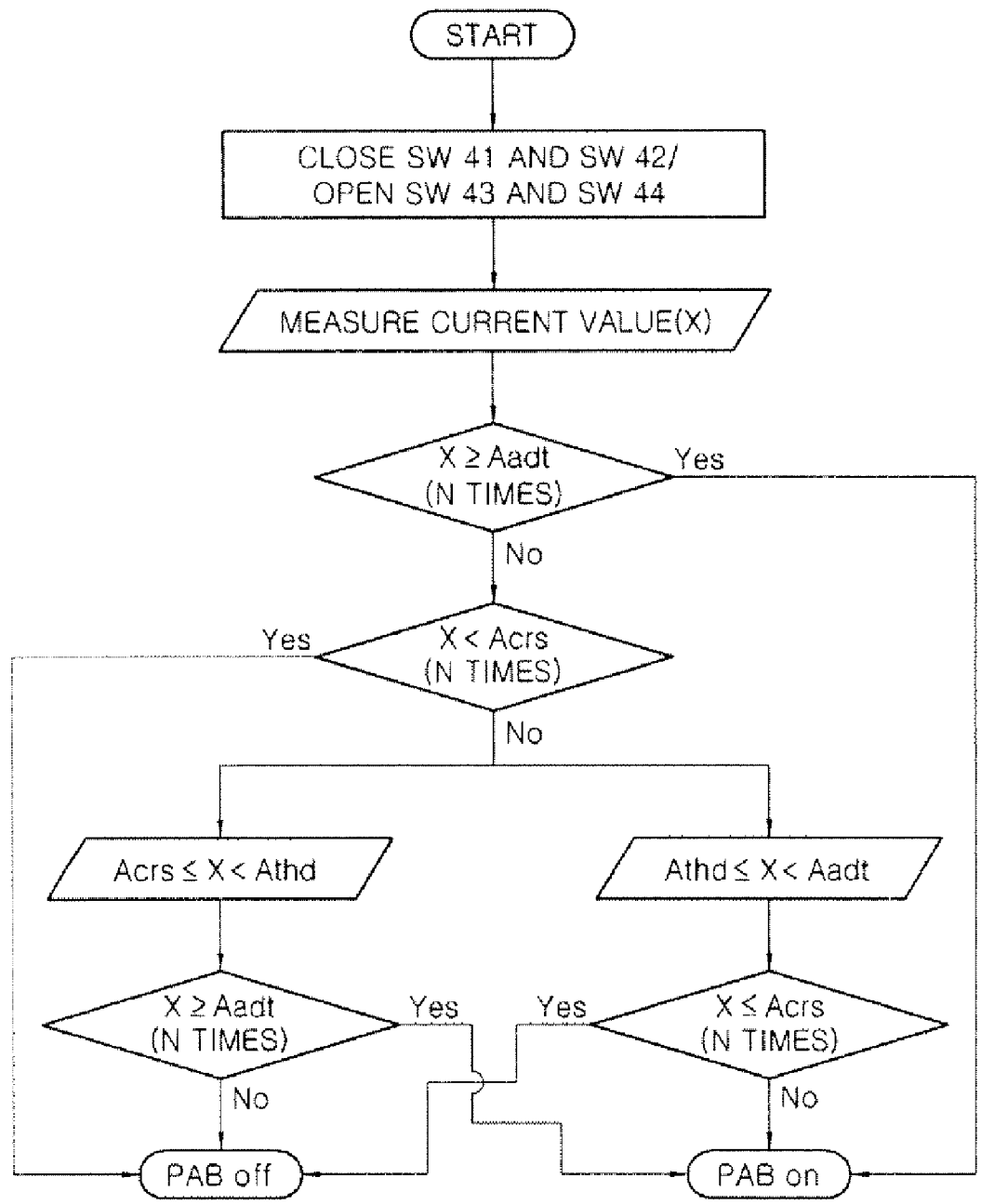
FIG. 6 is a flowchart showing a process for classifying vehicle occupants using the vehicle occupant classification system of FIG. 4 according to the present invention.
Figure 7:
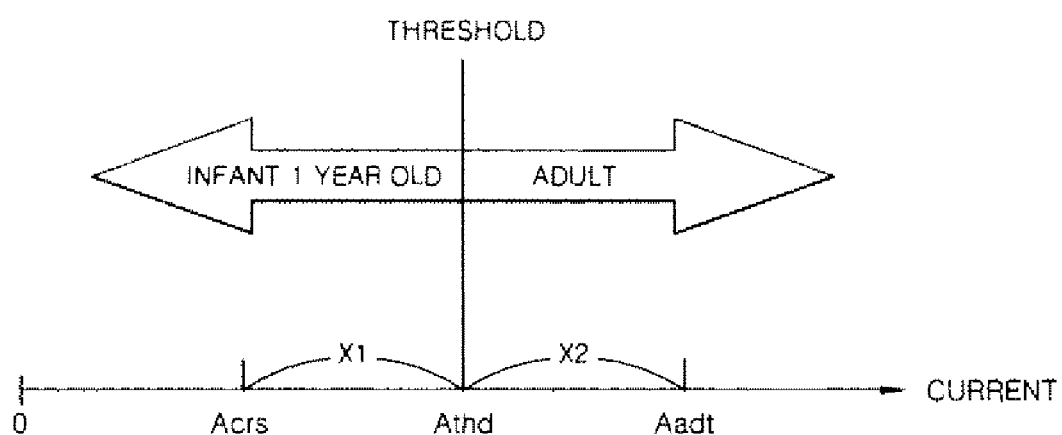
FIG. 7 is a diagram showing a characterized vehicle occupant classification method, applied when the identification of an occupant is vague, in the classification of occupants based on the flowchart of FIG. 6 according to the present invention.

With reference to FIGS. 6 and 7 together with the above drawings, the exemplary process for classifying vehicle occupants using the vehicle occupant classification system is described in accordance with the present invention.

When an occupant classification loop starts, the controller 60 closes the first and second switches 41 and 42, opens the third and fourth switches 43 and 44, and determines whether an occupant is seated and which type of occupant is sitting by comparing a current value X measured by the detector 50 with the following preset comparison values.

Zero value: a current value when an occupant is not seated in a seat.

Infant maximum value (Acrs): the maximum current value when an infant 1 year old or younger, protected by a Child Restraint System (CRS), is assumed to be seated in a seat. For this value, an optimized value can be derived on the basis of the results of a plurality of experiments and statistical records.

Adult minimum value (Aadt): the minimum current value when an adult is assumed to be seated in a seat. Similar to the infant maximum value, this value can be obtained from the results of experiments and statistical records.

Threshold value (Athd): the current value between the infant maximum value (Acrs) and the adult minimum value (Aadt), which is preferably set to an intermediate value between the infant maximum value (Acrs) and the adult minimum value (Aadt).

The criteria for determination based on the comparison of the measured current value X with the comparison values are described as follows.

If X=zero value: then, it is state in which an occupant is not seated

If Zero value $<X<$Athd, then, it is state in which an infant is seated

If Athd$\leqq X<$Aadt, then it is state in which an adult is seated

With reference to FIG. 6, the method of comparing the measured current value X with the preset comparison values and performing determination is partially described.

The controller 60 successively determines several times whether the measured current value X is equal to or greater than the adult minimum value (Aadt). For example, the controller 60 determines whether each of the forward current values, successively measured by the detector 50 three times, is a value that is equal to or greater than the adult minimum value (Aadt). If "Yes" is successively selected three times as a result of the determination, the controller determines that the occupant is an adult, and transmits a passenger seat airbag on signal (Passenger Air Bag ON: PAB ON) to the ACU. In contrast, if "No" is successively selected three times as a result of the determination, the controller 60 successively determines three times whether the measured current value is less than the infant maximum value (Acrs). In this case, if it is successively determined three times that the measured current value X is less man the infant maximum value (Acrs), the controller 60 determines that the occupant is an infant 1 year old or younger, and transmits a PAB OFF signal to the ACU.

Meanwhile, as shown in FIG. 7, when the measured current value X exists in a region X1 or X2 close to the threshold value (Athd), the determination of the system may be inaccurate. When the measured value X is close to the threshold value (Athd), there is the risk that the determination of an occupant by the system may change at any time even on the slight change of the posture of the occupant or the like. Such a determination error occurs in extremely exceptional situations, but may result in consumers' distrusting the system, and thus it must be eliminated. Therefore, in the present invention, occupants are classified according to the following criteria, and thus the type of occupant is determined.

For Acrs$\leqq X<$Athd: determination is changed in such a way that an occupant is determined to be an adult only when a current value, measured after this condition is met, is equal to or greater than the adult minimum value (Aadt), and thereafter a PAB ON signal is transmitted to the ACU.

For Athd$\leqq X<$Aadt: determination is changed in such a way that an occupant is determined to be an infant only when the current value, measured after this condition is met, is equal it) or less than the infant maximum value (Acrs), and thereafter a PAB OFF signal is transmitted to the ACU.

Even in the above case, there is a need to compare measured current values, successively detected several times, with comparison values.

Meanwhile, the measured current values X and the comparison values in the above-described occupant classification process are forward current values. However, it is noted that the execution of the occupant classification loop is possible even if the diode 14 is not provided.

Figure 8:
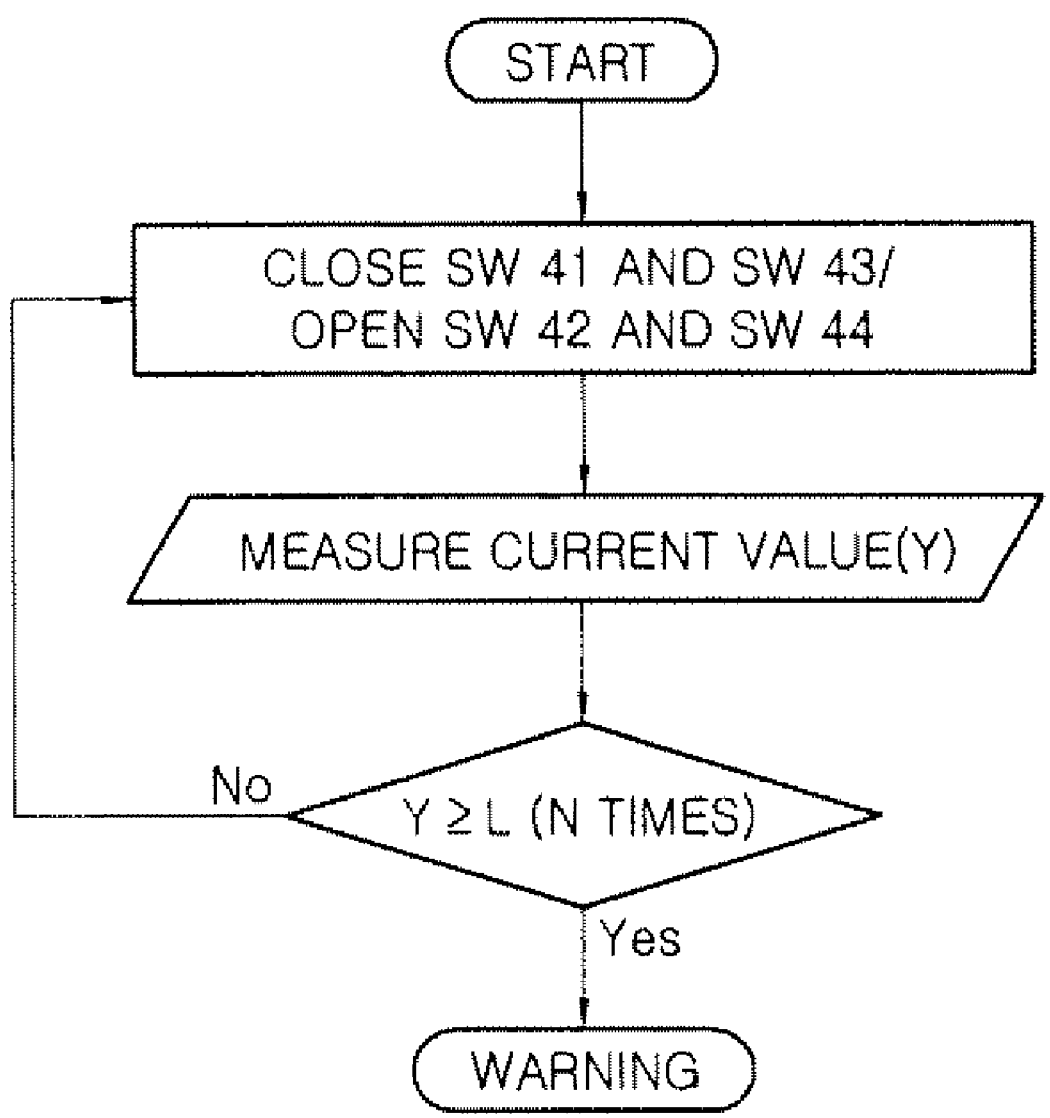
FIG. 8 is a flowchart showing a self-diagnostic process by the vehicle occupant classification system of FIG. 4 according to the present invention.
Figure 9:
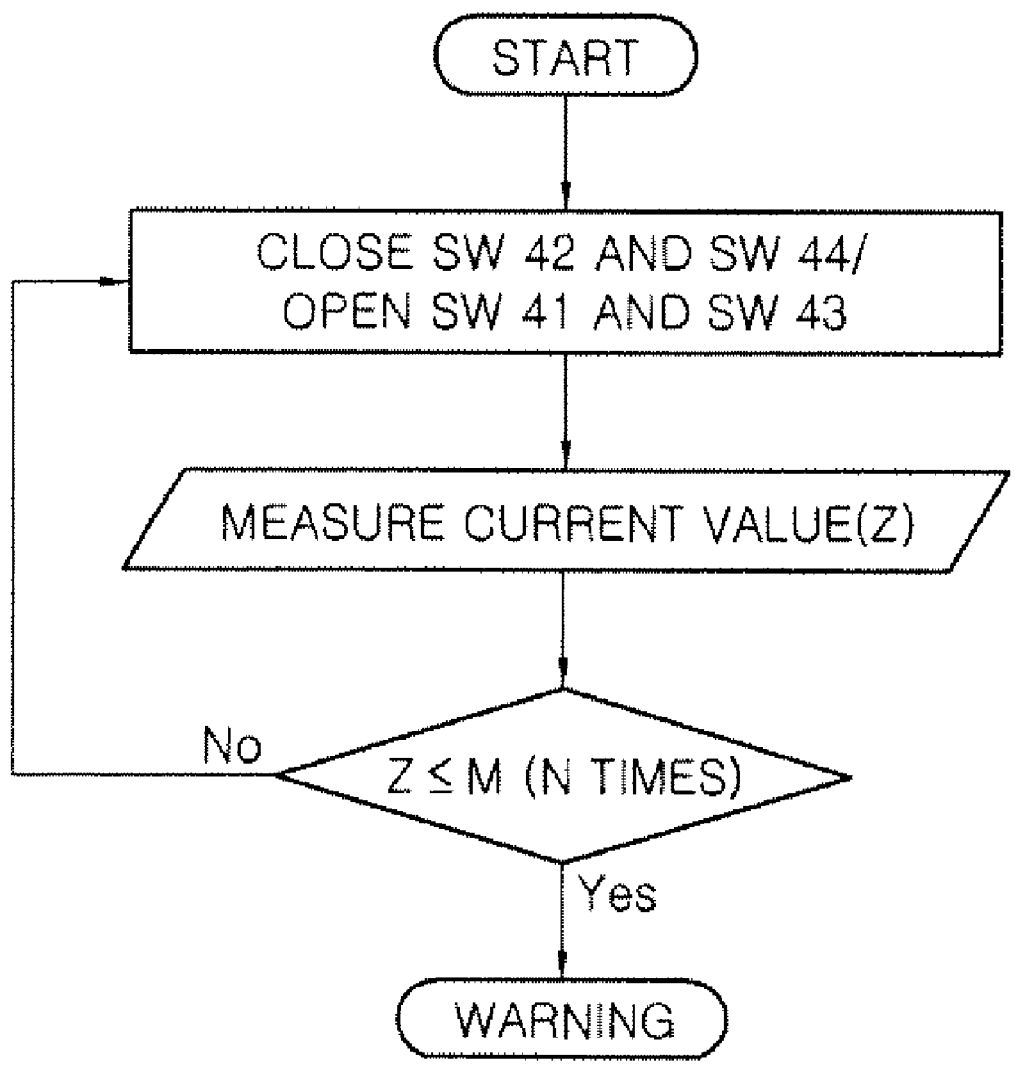
FIG. 9 is a flowchart showing another self-diagnostic process in the vehicle occupant classification system of FIG. 4 according to the present invention.

With reference to FIGS. 8 and 9, referring together to the above drawings, the self-diagnostic process of the vehicle occupant classification system is described.

FIG. 8 is a flowchart showing a process for diagnosing a system error occurring due to excessive moisture in the sensing unit 10.

When excessive moisture is present in the sensing unit 10, the current value measured by the ammeter 20 increases, so that the system may erroneously determine that an occupant is an adult even if an infant is seated in the seat. Therefore, in order to solve this problem, the system periodically executes the moisture error diagnosis loop of FIG. 8.

When the moisture error diagnosis loop starts, the first and third switches 41 and 43 are closed, and tire second and fourth switches 42 and 44 are opened. Further, the controller 60 determines that an error is occurring in the vehicle occupant classification system when the value of current Y flowing through the diode 14 in the reverse direction is equal to or greater than a preset comparison reverse current value L, and thus transmits a warning signal to the ACU. The comparison reverse current L is a reverse current value when moisture error is not present, and typically has a value close to 0 due to the diode 14. Even in this ease, the measurement of the current value Y and the comparison of the current value Y with the preset comparison reverse current value L are successively performed several times.

FIG. 9 is a flowchart showing a process of diagnosing a system error occurring due to the aging of the sensing unit 10.

When the sensing unit 10 or the switching circuit 40 is aged or damaged, a resistance value increases. In this case, even if an infant is seated in a seat, an occupant may be erroneously determined to be an adult. Therefore, the system must periodically diagnose an aging error.

When the aging error diagnosis loop of the system starts, the second and fourth switches 42 and 44 are closed, and the first and third switches 41 and 43 are opened. The controller 60 determines that an error is occurring in the vehicle occupant classification system when the value of current Z flowing through the diode 14 in the forward direction is equal to or less than a preset comparison forward current value M, and thus transmits a warning signal to the ACU. In this case, the comparison forward current value M corresponds to the forward current value of the diode when the sensing unit 10 is in a good state. The measurement of the current value Y and comparison of the current value Z with the preset comparison forward current value M are successively performed several times.

As described above, the present invention provides a vehicle occupant classification system, which is advantageous in that, since the gap between the weights of infants 1 year old or younger and adults, which is required for identification thereof, that is, a gray zone, increases, the likelihood of erroneous occupant classification decreases, and an airbag can be accurately deployed at need. Further, the present invention is advantageous in that, in the case of an occupant having a current value close to threshold value (Athd), a phenomenon in which the determination of whether to deploy an airbag is frequently changed depending on the posture or other conditions of the occupant is prevented, thus improving consumers' credibility in the system while preventing the occurrence of erroneous occupant classification.

Further, the vehicle occupant classification system of the present invention is advantageous in that it diagnoses erroneous operation caused by the moisture of the surroundings of a sensor for sensing occupants, or caused by the aging of the system, and provides a warning, thus improving consumers' credibility in the system and preventing the occurrence of accidents caused by erroneous occupant classification.

Further, the vehicle occupant classification system of the present invention is advantageous in that it may use a sensor for measuring variation in current and may use a material, such as a patch covered with gold or silver, for the material of the sensor, so that the design of a vehicle seat is not restricted by the sensor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for classifying vehicle occupants, comprising:
a detector installed in a vehicle seat and adapted to sense variation in current occurring when an occupant is seated in the seat; and
a controller for determining whether the occupant is seated and which type of occupant is sitting, using a current value measured by the detector, and transmitting a result of determination to an airbag control unit, the controller operating,
wherein the controller compares the measured current value (X) with a preset zero value, infant maximum value (Acrs), adult minimum value (Aadt), and threshold value (Athd) existing between the infant maximum value and the adult minimum value, and thus determines that no occupant is seated when X=zero value, that an infant is seated when zero value <X<Athd, and that an adult is seated when Athd≦X<Aadt,
the controller changes determination thereof in such a way that, when Acrs≦X<Athd, an occupant is determined to be an adult when a current value, measured after this condition is met, is equal to or greater than the adult minimum value (Aadt), and
the controller changes determination thereof in such a way that, when Athd≦X<Aadt, an occupant is determined to be an infant when a current value, measured after this condition is met, is equal to or less than the infant maximum value (Acrs).

2. The system according to claim 1, wherein the controller compares current values successively measured several times with preset comparison values when at least a type of the occupant is determined, thus determining the type of the occupant.

3. A system for classifying vehicle occupants, comprising:
a detector installed in a vehicle seat and adapted to sense variation in current occurring when an occupant is seated in the seat; and
a controller for determining whether the occupant is seated and which type of occupant is sitting, using a current value measured by the detector, and transmitting a result of determination to an airbag control unit,
wherein the detector comprises:
a sensing unit installed under a cover of the seat and constructed such that an insulator is interposed between a sensing conductor and a guard conductor electrically connected to each other;
an ammeter for measuring an amount of current from the sensing unit; and
a switching circuit supplied with AC power and adapted to connect the sensing unit to the ammeter, thus constituting one or more closed circuits therewith, wherein:
the controller compares the measured current value (X) with a preset zero value, infant maximum value (Acrs), adult minimum value (Aadt), and threshold value (Athd) between the infant maximum value (Acrs) and the adult minimum value (Aadt), and thus determines that no occupant is seated when X=zero value, that an infant is seated when zero value <X<Athd, and that an adult is seated when Athd≦X<Aadt,
the controller changes determination thereof in such a way that, when Acrs≦X<Athd, an occupant is determined to be an adult when a current value, measured after this condition is met, is equal to or greater than the adult minimum value (Aadt), and
the controller changes determination thereof in such a way that, when Athd≦X<Aadt, an occupant is determined to be an infant when a current value, measured after this condition is met, is equal to or less than the infant maximum value (Acrs).

4. The system according to claim 3, wherein the switching circuit is connected to a diode.

5. The system according to claim 4, wherein the diode is arranged between the sensing conductor and the guard conductor.

6. The system according to claim 4, wherein the controller selectively turns on/off switches of the switching circuit, determines whether a value of current (Y) flowing through the diode in a reverse direction is equal to or greater than a preset comparison reverse current value (L), and determines that a system error is occurring in the vehicle occupant classification system and transmits a warning signal to the airbag control unit if the current value (Y) is equal to or greater than the comparison reverse current value (L).

7. The system according to claim 4, wherein the controller selectively turns on/off switches of the switching circuit, determines whether a value of current (Z) flowing through the diode in a forward direction is equal to or less than a preset comparison forward current value (M), and determines that a system error is occurring in the vehicle occupant classification system and transmits a warning signal to the airbag control unit if the current value (Z) is equal to or less than the comparison forward current value (M).

8. The system according to claim 6 or 7, wherein the controller compares current values, successively measured several times, with preset comparison values of the comparison reverse current value (L) and the comparison forward current value (M), thus determining whether the system error has occurred.

* * * * *